US012699623B1

(12) United States Patent
Black et al.

(10) Patent No.: US 12,699,623 B1
(45) Date of Patent: Aug. 4, 2026

(54) MINIMALLY MONITORED ANOMALY SOURCE DETECTION BASED ON SEASONALITY

(71) Applicant: THE HUNTINGTON NATIONAL BANK, Columbus, OH (US)

(72) Inventors: Jason W. Black, Columbus, OH (US); Cameron J. Conte, Columbus, OH (US); Gregory A. McCracken, Columbus, OH (US)

(73) Assignee: The Huntington National Bank, Columbus, OH (US)

( * ) Notice: Subject to any disclaimer, the term of this patent is extended or adjusted under 35 U.S.C. 154(b) by 0 days.

(21) Appl. No.: 19/386,433

(22) Filed: Nov. 12, 2025

(51) Int. Cl.
*G06F 11/07* (2006.01)

(52) U.S. Cl.
CPC ...... *G06F 11/0793* (2013.01); *G06F 11/0706* (2013.01); *G06F 11/079* (2013.01)

(58) Field of Classification Search
CPC . G06F 11/079; G06F 11/0706; G06F 11/0793
See application file for complete search history.

(56) References Cited

U.S. PATENT DOCUMENTS

| | | | | |
|---|---|---|---|---|
| 12,267,349 | B1 * | 4/2025 | Black | H04L 63/1425 |
| 12,355,794 | B1 * | 7/2025 | Black | H04L 63/1425 |

* cited by examiner

*Primary Examiner* — Benjamin A Kaplan
(74) *Attorney, Agent, or Firm* — Kilpatrick Townsend & Stockton LLP

(57) ABSTRACT

System, methods, and machine-readable media may facilitate minimally monitored anomaly source detection based on seasonality. Time series data individually corresponding to entities may be obtained. For each entity or for each cluster of entities, statistical parameter fingerprints may be generated. For each entity or cluster, the statistical parameter fingerprints may be updated using a weighted averaging technique that incorporates newly received time series data. The statistical parameter fingerprints for a given entity or cluster may be compared across the time horizons to detect discrepancies indicative of seasonality. Anomaly detection thresholds may be defined for each time horizon based on the corresponding statistical parameter fingerprints. An anomalous value in the time series data of an entity or cluster may be detected by determining that a value falls outside the anomaly detection threshold for at least one time horizon. Automated interventions may be performed based on a severity assessment.

20 Claims, 6 Drawing Sheets

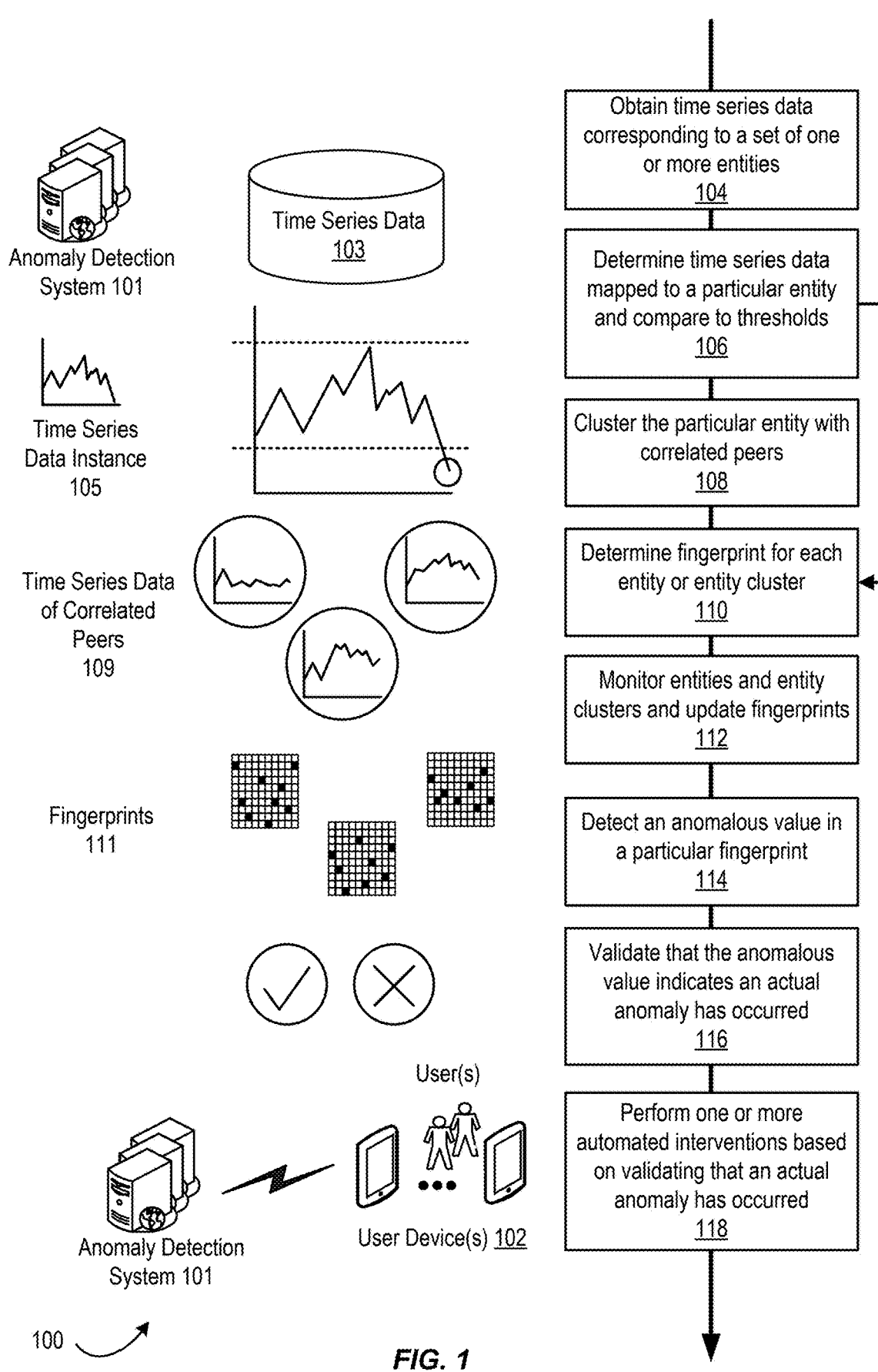

Anomaly Detection System 101

Time Series Data 103

Time Series Data Instance 105

Time Series Data of Correlated Peers 109

Fingerprints 111

User(s)

Anomaly Detection System 101

User Device(s) 102

Obtain time series data corresponding to a set of one or more entities
104

Determine time series data mapped to a particular entity and compare to thresholds
106

Cluster the particular entity with correlated peers
108

Determine fingerprint for each entity or entity cluster
110

Monitor entities and entity clusters and update fingerprints
112

Detect an anomalous value in a particular fingerprint
114

Validate that the anomalous value indicates an actual anomaly has occurred
116

Perform one or more automated interventions based on validating that an actual anomaly has occurred
118

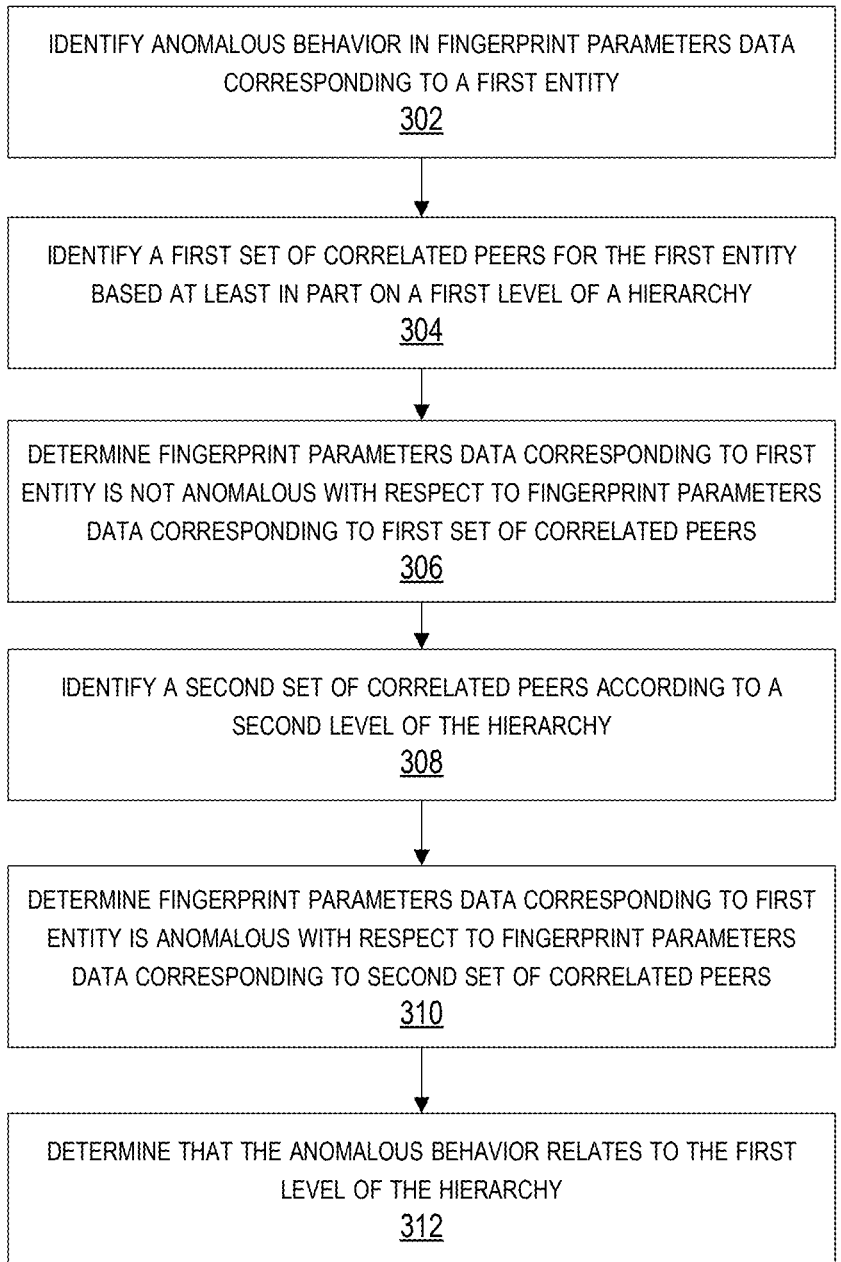

IDENTIFY ANOMALOUS BEHAVIOR IN FINGERPRINT PARAMETERS DATA CORRESPONDING TO A FIRST ENTITY
302

IDENTIFY A FIRST SET OF CORRELATED PEERS FOR THE FIRST ENTITY BASED AT LEAST IN PART ON A FIRST LEVEL OF A HIERARCHY
304

DETERMINE FINGERPRINT PARAMETERS DATA CORRESPONDING TO FIRST ENTITY IS NOT ANOMALOUS WITH RESPECT TO FINGERPRINT PARAMETERS DATA CORRESPONDING TO FIRST SET OF CORRELATED PEERS
306

IDENTIFY A SECOND SET OF CORRELATED PEERS ACCORDING TO A SECOND LEVEL OF THE HIERARCHY
308

DETERMINE FINGERPRINT PARAMETERS DATA CORRESPONDING TO FIRST ENTITY IS ANOMALOUS WITH RESPECT TO FINGERPRINT PARAMETERS DATA CORRESPONDING TO SECOND SET OF CORRELATED PEERS
310

DETERMINE THAT THE ANOMALOUS BEHAVIOR RELATES TO THE FIRST LEVEL OF THE HIERARCHY
312

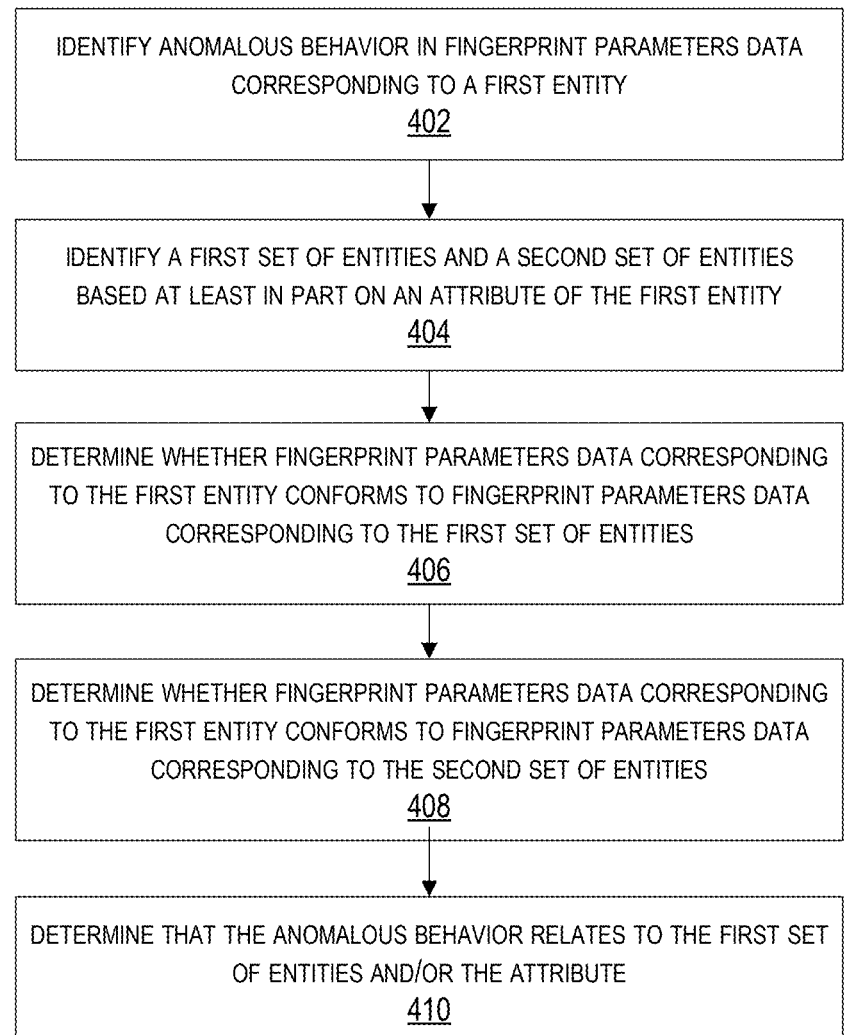

IDENTIFY ANOMALOUS BEHAVIOR IN FINGERPRINT PARAMETERS DATA
CORRESPONDING TO A FIRST ENTITY
402

IDENTIFY A FIRST SET OF ENTITIES AND A SECOND SET OF ENTITIES
BASED AT LEAST IN PART ON AN ATTRIBUTE OF THE FIRST ENTITY
404

DETERMINE WHETHER FINGERPRINT PARAMETERS DATA CORRESPONDING
TO THE FIRST ENTITY CONFORMS TO FINGERPRINT PARAMETERS DATA
CORRESPONDING TO THE FIRST SET OF ENTITIES
406

DETERMINE WHETHER FINGERPRINT PARAMETERS DATA CORRESPONDING
TO THE FIRST ENTITY CONFORMS TO FINGERPRINT PARAMETERS DATA
CORRESPONDING TO THE SECOND SET OF ENTITIES
408

DETERMINE THAT THE ANOMALOUS BEHAVIOR RELATES TO THE FIRST SET
OF ENTITIES AND/OR THE ATTRIBUTE
410

COMPUTING DEVICE 600

PROCESSOR(S) 602

ADDITIONAL STORAGE 608

I/O DEVICE(S) 618

COMMUNICATION CONNECTIONS 616

MEMORY 604

O/S 610

DATA STORE 612

ANOMALY DETECTION SYSTEM 614

MINIMALLY MONITORED ANOMALY SOURCE DETECTION BASED ON SEASONALITY

BACKGROUND

Anomaly detection techniques generally involve identifying points of data which fall outside of a normal trend for a specific data set. The points of data may be of particular interest since the points of data may represent inconsistencies with normal operations in industries where identifying inconsistencies is important to ensure proper operations and/or identify faults that need corrective actions. Modern data sets include increasingly large and complex amounts of data such that traditional approaches to accurately identify and detect anomalies in a way that is meaningful is increasingly challenging and time consuming.

In systems where there are millions, tens of millions, or more users with associated data sets and resources, monitoring every single user and associated data sets, resources, and resource transfer operation is very computationally and analytically intensive. Thus, there is a need for systems and methods that address complexities, reduce computational overhead, increase efficiencies, increase speeds, and otherwise improve anomaly source detection. These and other needs are addressed by the present disclosure.

BRIEF SUMMARY

Techniques are provided for minimally monitored anomaly source detection based on seasonality. Various embodiments are described herein, including methods, systems, non-transitory computer-readable storage media storing programs, code, or instructions executable by one or more processors, and the like.

In one aspect, a system may include one or more processing devices and memory communicatively coupled with and readable by the one or more processing devices. The memory may include processor-readable instructions which, when executed by the one or more processing devices, cause the system to perform one or a combination of the following operations. Time series data individually corresponding to a plurality of entities may be obtained. For each entity of the plurality of entities or for each cluster of entities of the plurality of entities, statistical parameter fingerprints may be generated and may include at least mean and variance values calculated across a plurality of time horizons, the plurality of time horizons including at least a first horizon and a second horizon. The statistical parameter fingerprints may be stored in a data store associated with the system. For each entity or cluster, the statistical parameter fingerprints may be updated using a weighted averaging technique that incorporates newly received time series data. The statistical parameter fingerprints for a given entity or cluster may be compared across the plurality of time horizons to detect discrepancies indicative of seasonality. Anomaly detection thresholds may be defined for each time horizon based at least in part on the corresponding statistical parameter fingerprints. An anomalous value in the time series data of an entity or cluster may be detected by determining that a value falls outside the anomaly detection threshold for at least one time horizon. Upon validating that an anomaly has occurred, one or more automated interventions may be performed based on a severity assessment.

In another aspect, method may include one or a combination of the following, which may be performed by a computer system. Time series data individually corresponding to a plurality of entities may be obtained. For each entity of the plurality of entities or for each cluster of entities of the plurality of entities, statistical parameter fingerprints may be generated and may include at least mean and variance values calculated across a plurality of time horizons, the plurality of time horizons including at least a first horizon and a second horizon. The statistical parameter fingerprints may be stored in a data store associated with the computer system. For each entity or cluster, the statistical parameter fingerprints may be updated using a weighted averaging technique that incorporates newly received time series data. The statistical parameter fingerprints for a given entity or cluster may be compared across the plurality of time horizons to detect discrepancies indicative of seasonality. Anomaly detection thresholds may be defined for each time horizon based at least in part on the corresponding statistical parameter fingerprints. An anomalous value in the time series data of an entity or cluster may be detected by determining that a value falls outside the anomaly detection threshold for at least one time horizon. Upon validating that an anomaly has occurred, one or more automated interventions may be performed based on a severity assessment.

In yet another aspect, one or more non-transitory, machine-readable media may have machine-readable instructions thereon which, when executed by one or more processing devices, cause a system to perform one or a combination of the following operations. Time series data individually corresponding to a plurality of entities may be obtained. For each entity of the plurality of entities or for each cluster of entities of the plurality of entities, statistical parameter fingerprints may be generated and may include at least mean and variance values calculated across a plurality of time horizons, the plurality of time horizons including at least a first horizon and a second horizon. The statistical parameter fingerprints may be stored in a data store associated with the system. For each entity or cluster, the statistical parameter fingerprints may be updated using a weighted averaging technique that incorporates newly received time series data. The statistical parameter fingerprints for a given entity or cluster may be compared across the plurality of time horizons to detect discrepancies indicative of seasonality. Anomaly detection thresholds may be defined for each time horizon based at least in part on the corresponding statistical parameter fingerprints. An anomalous value in the time series data of an entity or cluster may be detected by determining that a value falls outside the anomaly detection threshold for at least one time horizon. Upon validating that an anomaly has occurred, one or more automated interventions may be performed based on a severity assessment.

In various embodiments, whether the detected anomalous value is an anomaly may be validated by comparing the statistical parameter fingerprints of the entity or cluster to those of one or more correlated peers, the correlated peers identified based on shared hierarchical and/or attribute values. In various embodiments, the anomaly detection thresholds may be adjusted dynamically in response to statistical feedback from cluster-level analysis. In various embodiments, the one or more automated interventions may include blocking a resource transfer. In various embodiments, the one or more automated interventions may include freezing an account. In various embodiments, the automated interventions may be triggered according to a threat matrix that maps anomaly scores to specific intervention actions. In various embodiments, the threat matrix may be dynamically updated based on intervention outcomes. In various embodiments, the validating whether the detected anomalous value is an anomaly may further include identifying correlated peers for the entity or cluster based on a first level of a hierarchy, and, when the statistical parameter fingerprints of the entity or cluster are not anomalous with respect to the first level peers, correlated peers may be identified based on a second level of the hierarchy and determining whether the statistical parameter fingerprints of the entity or cluster are anomalous with respect to the correlated peers based on the second level.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 1 is an example flow for validating, based on time series data of entities that are associated with one another in at least one dimension, that an anomaly has occurred, in accordance with at least one embodiment;

FIG. 2 is an example block diagram illustrating an example hierarchy with which a number of entities correspond, in accordance with at least one embodiment;

FIG. 3 is a block diagram illustrating an example method for identifying a source of an anomaly based at least in part on entity fingerprint parameters data, in accordance with at least one embodiment;

FIG. 4 is an example block diagram illustrating an example method for determining one or more correlated peers utilizing division/clustering techniques, in accordance with at least one embodiment;

DETAILED DESCRIPTION

Figure 5:
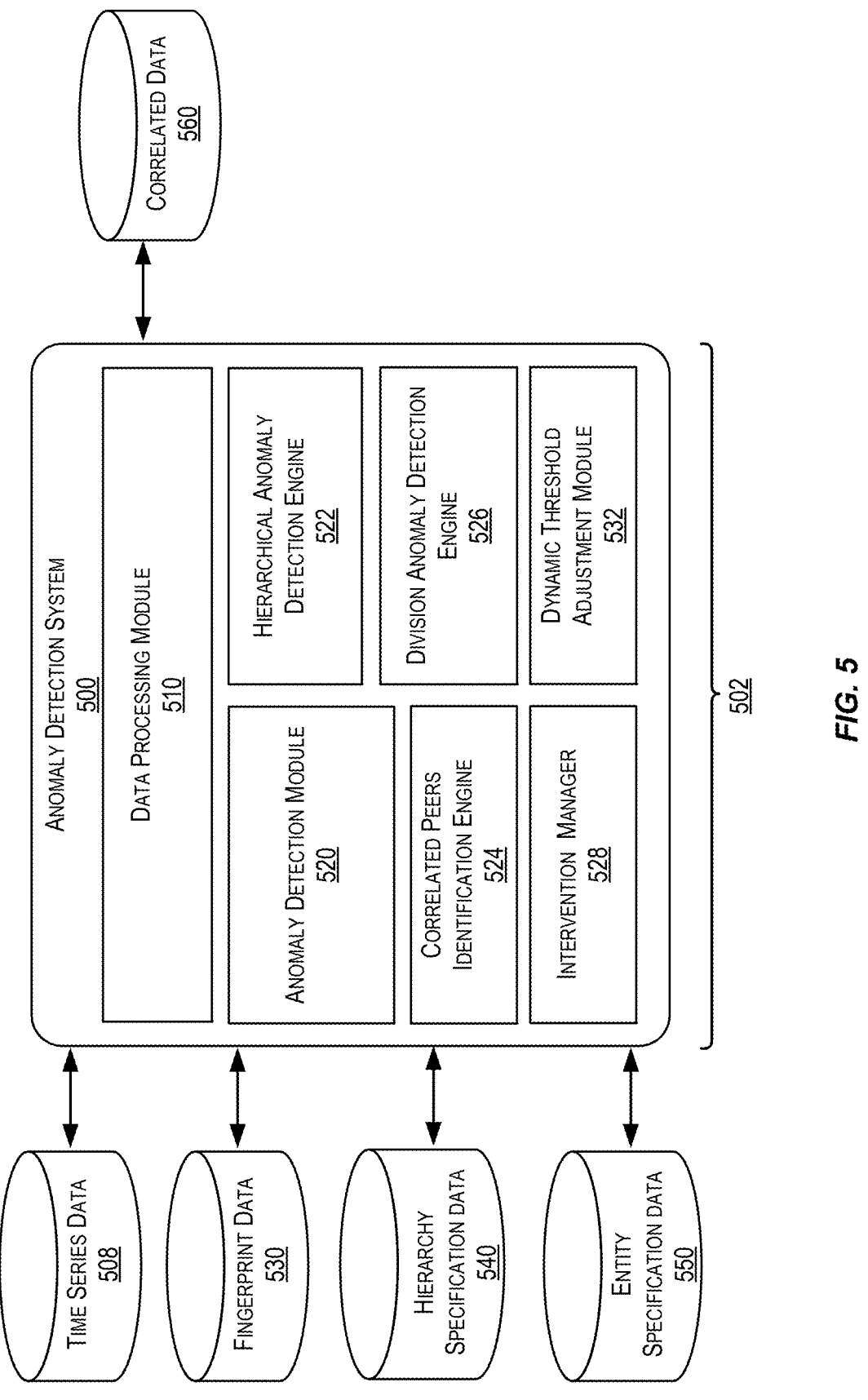
FIG. 5 is a block diagram illustrating computer architecture for an anomaly detection system, in accordance with at least one embodiment.

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Various embodiments are described herein, including methods, systems, non-transitory computer-readable storage media storing programs, code, or instructions executable by one or more processors, and the like. Some or all of the processes described herein (or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Various embodiments according to the present disclosure may provide for a comprehensive system for minimally monitored anomaly source detection based on seasonality, with applications in attack/wrongful use prevention and operational monitoring. Various embodiments may provide for one or a combination of compression of time series data to entity-specific parameter fingerprints or cluster-specific parameter fingerprints, cluster feedback loops, dynamic thresholding, automated interventions, and selective high-frequency monitoring with scalable solutions for attack/wrongful use prevention and operational monitoring.

In various data analysis methodologies, anomaly detection may be used in a number of industries to determine if a dataset contains an anomaly (e.g., an outlier, data that does not align with what may typically be considered to be normal behavior for the data set). Anomalous behavior may be detected in data corresponding to a first entity. Often, and perhaps erroneously, conventional techniques may identify the source of the anomaly as the entity corresponding to the data with which the anomaly was detected. Conventionally, the impact of the anomaly may be considered to be only the entity corresponding to the data with which the anomaly was detected. However, it may be the case that the source/impact of the abnormality spans more than the single entity that is associated with the data with which the abnormality was detected. Determining a source and/or impact for the anomaly may be difficult when the data set has a high number of dimensions (e.g., different types of entities, each having a variety of attributes that may be the same or different from one another).

One approach to detecting unusual activity could involve building a time series model for every entity account ("acct"). This would entail analyzing each entity's historical data to create a times series model that predicts expected behavior, then using it to assess whether a particular resource transfer is statistically abnormal for that entity acct. While conceptually straightforward, this method would involve calibrating, maintaining, and updating, say 100,000 or even four million models, each requiring significant computational resources and analytical effort. This approach would be prohibitively resource-intensive, especially when scaled to large user bases. The complexity would grow exponentially with the number of models, introducing threats of overfitting, inaccuracies, and operational challenges in maintaining and updating such a vast system. Moreover, simply setting a threshold to flag resource transfers and manually investigating flagged transfers likewise becomes manually intensive at scale and leads to signal fatigue. In contrast, disclosed embodiments may avoid these complexities, intense resource requirements, inefficiencies, and other challenges by leveraging aggregated statistical parameters across time horizons, providing a more scalable and efficient solution.

To address the problem of monitoring large numbers of entity accts for unusual resource transfer operations, for example, while balancing computational efficiency and accuracy, various embodiments may use statistical parameters (e.g., mean and variance) across multiple time horizons. For each entity or cluster of entities, the system according to disclosed embodiments (e.g., anomaly detection system) may define statistical parameters—e.g., mean and variance—across multiple time horizons that correspond to an entity-specific or cluster-specific fingerprint. These timeframes may be selected by the system based on the system-observed context of each entity acct, with each horizon contributing parameters (e.g., mean and variance), resulting in, for example, eight to ten parameters per entity acct, depending on the granularity of monitoring. Additional time horizons such as weekly may be added to capture patterns such as resource transfer cycles, further refining the anomaly detection process.

Beyond entity accts, the system may apply its methodology to monitor branches, ATMs, or transfer volumes. For example, an ATM with unusual withdrawal patterns may be flagged by the system using the same statistical framework. This versatility may allow the system to detect anomalies in various scenarios involving time-series data, such as branch activity or transfer frequency. Advantageously, the methodology may decrease storage requirements, with, for example, eight to ten parameters being stored per entity. Scalability may be achieved through distributed computing frameworks, and the system may be validated using historical data to ensure parameters accurately capture normal behavior and detect real anomalies.

In some embodiments, automated interventions may be implemented based on detection of the anomaly source. In some embodiments, any suitable number of interventions may be employed by one or more systems to notify, mitigate, forecast, and/or limit potential negative effects caused by the anomalous source. In some embodiments, these interventions may be triggered by the techniques discussed herein automatically or by user defined presets. For example, the system may provide for automated interventions and may include a rules-based intervention engine, which may automatically trigger predefined actions (e.g., blocking resource transfers, freezing entity accts, sending alerts to compliance teams) in response to detected anomalies. These interventions may be governed by a threat matrix, which maps anomaly severity (e.g., scores from 1-100) to specific actions aligned with compliance and prevention protocols. For instance, high-severity anomalies—such as sudden spikes in transfer volumes or transfers—may trigger immediate blocking of resource transfers via API integration with resource-controlling systems or freezing entity accts to prevent unauthorized activity. Medium-severity anomalies, such as deviations in transfer patterns or entity behavior, may prompt automated alerts to internal teams via email, SMS, or process flow notifications for investigation or escalation. Low-severity anomalies, such as minor data inconsistencies or routine transfer delays, may be logged for future analysis or flagged for manual review. This framework may ensure proactive threat mitigation, preventing attack/wrongful use, unauthorized transfers, and regulatory breaches by acting before human intervention is required.

The system may integrate seamlessly with resource-controlling systems backend processes through APIs, microservices, and process flow engines tailored for resource-controlling systems. For example, resource transfer blocking APIs can halt suspicious transfers to prevent unauthorized activity, while entity acct freeze APIs can lock entity accts when anomalies are detected. Compliance alert process flows can send notifications to internal teams via email, SMS, or internal ticketing systems for follow-up. Additionally, the system may implement compliance process flows, which automatically adjust thresholds or rules based on historical intervention success rates. Various embodiments will now be disclosed in greater detail with reference to the accompanying figures, beginning with FIG. 1.

FIG. 1 illustrates an example flow 100 for validating, based on time series data of entities that are associated with one another in at least one dimension, that an anomaly has occurred, in accordance with at least one embodiment. The operations discussed in connection with FIG. 1 may be performed with an anomaly detection system 101. In some embodiments, anomaly detection system 101 may be implemented by one or more computers, as a service, within an application, and/or the like. The operations discussed in connection with FIG. 1 may be performed in any suitable order. More or fewer operations than those depicted in FIG. 1 may be employed without diverting from this disclosure.

To address the problem of monitoring large numbers of entity accts (e.g., 1,000, 10,000, 100,000, millions, tens of millions, or more entity accts) for unusual resource transfer operations, for example, while balancing computational efficiency and accuracy, the anomaly detection system 101 may use statistical parameters (e.g., mean and variance) across multiple time horizons. Fingerprint parameters may correspond to entity-specific or cluster-specific statistical summaries derived from time-series data—including mean inflows/outflows, variance in transfers, and confidence intervals across multiple time horizons, such as annual, semiannual, quarterly, and monthly (and/or more granular horizons such as weekly, daily, hourly, etc.)—used to quantify deviations in entity behavior. An entity fingerprint may correspond to a set of fingerprint parameter values specific to a particular entity. A cluster may refer to a group of entities that share one or more attributes (e.g., industry, size, entity acct type, location) at a specific hierarchical level. A cluster fingerprint may correspond to a set of fingerprint parameter values specific to a particular cluster of entities, where each entity of the cluster has one or more attributes in common. Accordingly, for each entity or cluster of entities, the anomaly detection system 101 may define statistical parameters—e.g., mean and variance—across multiple time horizons, such as annual, semiannual, quarterly, and monthly (and/or more granular horizons such as weekly, daily, hourly, etc.) that correspond to an entity-specific or cluster-specific fingerprint. These timeframes may be selected by the anomaly detection system 101 based on the system-observed context of each entity acct, with each horizon contributing parameters (e.g., mean and variance), resulting in, for example, eight to ten parameters per entity acct, depending on the granularity of monitoring. Additional time horizons such as weekly may be added to capture patterns such as resource transfer cycles, further refining the anomaly detection process.

For example, say an entity acct has an annual average of 100 units with a standard deviation of 10, and their semiannual and monthly averages are also around 100±10. If the anomaly detection system 101 determines that all these metrics align closely, the anomaly detection system 101 may determine consistent behavior with minimal seasonality—essentially flat activity within normal noise levels. However, if seasonality is detected—such as higher activity in the fall and lower in the spring—the annual mean may fall between these extremes, resulting in a larger standard deviation due to the wide range of values. In contrast, the anomaly detection system 101 may detect a semiannual mean during the low season (e.g., spring) that might show a smaller standard deviation, reflecting the narrower range of values during that period.

This discrepancy between the annual and semiannual means may be determined by the anomaly detection system 101 to signal the presence of seasonality. For example, if an entity acct experiences a temporary dip in activity during the spring (a low season), the annual average might falsely suggest an anomaly, while the anomaly detection system 101 may determine the semiannual average to confirm that the behavior is still within normal bounds. By analyzing these time horizons and storing their mean and standard deviation values, the anomaly detection system 101 may avoid the need to maintain complex models for each entity acct. Instead, the anomaly detection system 101 may update these parameters daily using the latest data point, ensuring computational efficiency. Each day, the anomaly detection system 101 may evaluate whether an entity acct falls outside the defined thresholds for all, some, or none of the time horizons (e.g., annual, semiannual, monthly), based on their mean and standard deviation. This may allow for a nuanced interpretation of anomalies—distinguishing between genuine outliers and deviations that may be explained by seasonal patterns or normal fluctuations. This approach may allow the anomaly detection system 101 to detect true anomalies while factoring in seasonal fluctuations, without relying on full time-series analysis or model-building. This approach may significantly reduce computational time, data storage requirements, and the overhead of maintaining seasonality models, while still effectively capturing seasonal effects through threshold comparisons across multiple time frames. It may also eliminate the need to explicitly build or train complex seasonality models.

The anomaly detection system 101 may use anomaly detection thresholds. Thresholds, such as ±3 standard deviations, may be set by the anomaly detection system 101 for each time horizon to define what constitutes an unusual value. Anomalies may be flagged if a resource transfer falls outside these thresholds for at least one horizon. To reduce false positives, the anomaly detection system 101 may evaluate discrepancies across multiple horizons, allowing context (e.g., seasonality and/or entity acct type) to inform whether an outlier is truly anomalous or part of a known pattern. The anomaly detection system 101 may be configured to detect seasonality. Seasonality may be detected by the anomaly detection system 101 by comparing short-term (e.g., monthly) and long-term (e.g., annual) parameters. If discrepancies exist, the anomaly detection system 101 may infer a seasonal pattern.

The anomaly detection system 101 may provide for threshold tuning and sensitivity. Thresholds may be adjusted globally for simplicity or tailored to specific entities or clusters. Tighter thresholds (e.g., ±2σ) may increase sensitivity to anomalies but may generate more false positives, while looser thresholds (e.g., ±3σ) may reduce noise but threat missing subtle issues. The anomaly detection system 101 may further refine sensitivity by factoring in entity acct threat levels or cluster-specific fluctuation metrics, ensuring the anomaly detection system 101 adapts to varying contexts.

Moreover, the anomaly detection system 101 may minimize false positives by cross-referencing metrics across time horizons. For instance, even if one parameter appears abnormal, others may still align with expected behavior, reducing the likelihood of unnecessary alerts. This not only cuts down on computational resources but also reduces the manual effort required to investigate false positives, ensuring that alerts are more accurate and actionable.

The anomaly detection system 101 may generate daily updates (e.g., weighted averaging). Each day, the stored parameters may be updated by the anomaly detection system 101 using a weighted averaging method that incorporates the latest data point. For example, the annual mean for an entity acct may be recalculated by giving more weight to the most recent value while iteratively adjusting historical data. This process may ensure that parameters remain current without requiring a complete recalculation of historical trends, making the anomaly detection system 101 computationally efficient.

Beyond entity accts, the anomaly detection system 101 may apply its methodologies to monitor branches, ATMs, or transfer volumes. For example, an ATM with unusual withdrawal patterns may be flagged by the anomaly detection system 101 using the same statistical framework. This versatility may allow the anomaly detection system 101 to detect anomalies in various scenarios involving time-series data, such as branch activity or transfer frequency. Advantageously, the methodologies may decrease storage requirements, with, for example, eight to ten parameters being stored per entity. Scalability may be achieved through distributed computing frameworks, and the anomaly detection system 101 may be validated using historical data to ensure parameters accurately capture normal behavior and detect real anomalies.

For initialization and to establish baselines, historical data for each entity acct may be analyzed by the anomaly detection system 101 over a period (e.g., one to two years). During this phase, the mean and variance may be calculated for each defined time horizon (e.g., annual, semiannual, etc.). These computed values may be stored by the anomaly detection system 101 (e.g., in a database) as the initial parameters for the entity acct, forming a foundation for ongoing monitoring and updates. The anomaly detection system 101 may be configured to use clustering. With respect to handling new entity accts and/or those with relatively low volume, the anomaly detection system 101 may assign the entity accts to clusters based on factors, such as industry or location, using existing cluster parameters as defaults. The anomaly detection system 101 may use clustering to cluster entity accts by industry, location, or transfer behavior, enabling new entity accts to inherit cluster-specific parameters. For example, a new "lawncare" entity acct in Ohio may inherit seasonal patterns observed with respect to similar entity accts. Over time, their parameters may be refined as the anomaly detection system 101 accumulates new data, ensuring accuracy without relying on extensive historical records. For small or underrepresented entity accts, cluster-level trends may be monitored instead of individual data.

In some examples, the flow 100 may begin at block 104, where data relating to time series data 103 (data points captured over a time interval, such as a few hours or less, or a longer interval such as one to two years) is obtained. The time series data 103 may correspond to a set of one or more entities (e.g., entity accts, branches, ATMs, etc.). The time series data 103 may be obtained by monitoring (by way of a network connection such as the Internet) a data stream (including data for, for example, receipts, transfers, or similar) or the time series data 103 may be obtained by retrieving historical records (e.g., transfers from the previous day or other time interval), or any suitable combination thereof. The time series data 103 may include data across time periods that have pre-defined limits. For example, time series data 103 may include data recorded over a few seconds to a few years. Time series data 103 may include time series data from any suitable number of data sources. In some embodiments, the time series data may include common attributes with differing attribute values. For example, if the set of entities includes ATMs, a common attribute may be an ATM model, where the corresponding value indicates the model number of that particular ATM.

In some embodiments, the time series data 103 may include subsets of time series data (e.g., time series data retrieved from different entities to be correlated). By way of example, a first subset of the time series data 103 could include data corresponding to transfers processed at a specific branch. A second subset of the time series data 103 may include a number of entity acct denials during the last time interval at a specific branch. The first subset time series and the second subset time series may be included in the time series data 103. It is contemplated that any suitable number of subset time series may be included in the time series data 103 according to any suitable number of entities and/or attributes.

The flow 100 may continue at block 106, where the operations may determine, from the time series data, a set of the time series data mapped to a particular entity and assess the set of time series data with respect to one or more thresholds. In some embodiments, the anomaly detection system 101 may determine a time period over which the set of time series data applies and compare the time period to a time threshold. For example, the anomaly detection system 101 may determine that it has obtained time series data for a particular entity that covers a time period on the order of years (e.g., one to two) or a relatively short period of time (e.g., one to two months). In some cases, the anomaly detection system 101 may determine that a particular entity is a new entity with little to no time series data.

Additionally or alternatively, in various embodiments, the anomaly detection system 101 may determine a volume metric of the set of time series data and compare the volume metric to a volume threshold. For example, the anomaly detection system 101 may determine that the set of time series data has an average resource total (e.g., average daily balances) less than, equal to, or greater than the volume threshold, which may be initially predefined but may be dynamically adjusted by the anomaly detection system 101 as a function of the volume metrics for correlated peers corresponding to the entity. As examples, the initial volume metric may be defined as X units but adjusted over time to a volume metric that is the median volume metric of all correlated peers or such that X percent (e.g., 25% or more or less) of all correlated peers have volume metrics less than the threshold.

The anomaly detection system 101 may identify correlated peers, where a correlated peer may correspond to another entity that is associated with time series data that is identified (e.g., via one or more correlation techniques) as having substantially similar time series behavior as a first entity. By way of example, the anomaly detection system 101 may use a correlation technique (e.g., correlation matrix or similar) to identify correlated peers for time series data instance 105 (e.g., entities that are associated with time series data instances that evidence similar time series data behavior as time series data instance 105). This identification can occur at runtime or as a pre-processing step. The anomaly detection system 101 may maintain a mapping or other suitable association between correlated peers.

The anomaly detection system 101 may use one or more correlation techniques to identify similarities between time series data instance 105 and time series data of correlated peers 109. By way of example, anomaly detection system 101 may utilize various comparison techniques to compare the time series data instance 105 and the time series of time series data 103 such as correlation matrixes, covariance/variance ratios, time series fluctuation metrics, Pearson correlations, Kendall correlations, and/or the like. In some embodiments, the anomaly detection system 101 may use the time series data 105 and compare each datapoint to time series data 103 using a correlation matrix to determine correlation coefficients (e.g., 1 to −1 values arranged in columns and rows of a matrix showing strength and trends for each datapoint). When the time series data instance 105 and a second time series data instance show at least one relationship (predominately +1 or −1 correlation coefficients), the anomaly detection system 101 may determine that the two time series are correlated. Anomaly detection system 101 may maintain a mapping between the entity associated with time series data instance 105 and the second entity and/or anomaly detection system 101 may maintain a mapping between time series data instance 105 and the time series data instance associated with the second entity.

In an example, the time series data instance 105 may correspond to first entity of a particular entity type (e.g., entity accts, ATMs, branches, etc.), for example, a particular user entity acct associated with a lawncare operation located in Ohio. Using a correlation technique, the anomaly detection system 101 may identify additional entities as correlated peers based at least in part on each of those entities historically having similar time series behavior as the time series data instance 105. The anomaly detection system 101 may maintain associations between the first entity and its correlated peers. These correlated peers may, or may not, share similar attributes as the first entity.

In some embodiments, the anomaly detection system 101 may maintain separate associations based on shared attributes. For example, anomaly detection system 101 may maintain an association between the first entity and correlated peers that are located in the same city, another association between the first entity and correlated peers located in the same county, another association between the first entity and correlated peers located in the same state, and another association between the first entity and correlated peers located in the same geographical region. Additionally or alternatively, the anomaly detection system 101 may maintain a mapping between the first entity and all of its correlated peers from which subsets may be derived based on a shared attribute value. For example, a subset of the correlated peers may be derived based at least in part on identifying correlated peers that are associated with the same or similar location. A second subset of all correlated peers may be derived based at least in part on identifying the subset of correlated peers that are associated with the same or similar industry. A third subset of all correlated peers may be derived based on identifying correlated peers that have the same or similar transfer behavior. In some embodiments, correlated peers may be grouped into subsets based at least in part on a predefined hierarchy (e.g., industry then location then transfer behavior). For example, a subset of correlated peers may be identified from the set of correlated peers based at least in part on identifying correlated peers that are associated with the same industry, followed by identifying correlated peers that are located in the geographical region, and so on, in accordance with the predefined hierarchy.

For an entity with a corresponding time period that does not satisfy the time threshold and/or with a corresponding volume metric that does not satisfy the volume threshold, the flow 100 may continue to block 108. As indicated by block 108, the entity may be clustered with at least a subset of the correlated peers selected according to the hierarchy. The anomaly detection system 101 may use clustering to cluster entities by industry, location, or transfer behavior, enabling new entities to inherit cluster-specific parameters. For example, a new "lawncare" user in Ohio may inherit seasonal patterns observed in similar users. In some examples, the cluster may include those correlated peers that the anomaly detection system 101 determines to be the most specific subset with which the anomaly detection system 101 is able to correlate the entity according to the hierarchy based at least in part on a correlation threshold (e.g., a correlation coefficient) and data available for the entity and the available peers. However, for an entity with a corresponding time period that does satisfy the time threshold and with a corresponding volume metric that does satisfy the volume threshold, the flow 100 may continue to block 110 without clustering.

As indicated by block 110, the anomaly detection system 101 compress the time series data to entity-specific parameter fingerprints 111 or cluster-specific parameter fingerprints 111. For each entity or cluster of entities, the anomaly detection system 101 may define statistical parameters—e.g., mean and variance—across multiple time horizons, such as annual, semiannual, quarterly, and monthly (and/or more granular horizons such as weekly, daily, hourly, etc.) that correspond to an entity-specific or cluster-specific fingerprint 111. These time frames may be selected by the anomaly detection system 101 based on the system-observed context of each entity or entity cluster, with each horizon contributing parameters (e.g., mean and variance), resulting in, for example, eight to ten parameters per entity, depending on the granularity of monitoring. Additional time horizons such as weekly may be added to capture patterns such as resource transfer cycles, further refining the anomaly detection process.

For initialization and to establish fingerprint 111 baselines, historical time series data for each entity or entity cluster may be analyzed by the anomaly detection system 101 over a period (e.g., one to two years). During this phase, the mean and variance may be calculated for each defined time horizon (e.g., annual, semiannual, etc.). These computed values may be stored by the anomaly detection system 101 (e.g., in a database 103 or another database of the anomaly detection system 101 or communicatively coupled to the anomaly detection system 101) as the initial fingerprint parameters for the entity, forming a foundation for ongoing monitoring and updates.

As indicated by block 112, the anomaly detection system 101 may monitor the entities and entity clusters and update the fingerprints 111. Over time, their fingerprint parameters may be refined as the anomaly detection system 101 accumulates new data, ensuring accuracy without relying on extensive historical records. For example, the anomaly detection system 101 may generate daily updates (e.g., weighted averaging). Each day, the stored parameters may be updated by the anomaly detection system 101 using a weighted averaging method that incorporates the latest data point. For example, the annual mean for an entity may be recalculated by giving more weight to the most recent value while iteratively adjusting historical data. This process may ensure that parameters remain current without requiring a complete recalculation of historical trends, making the system computationally efficient.

As indicated by block 114, the anomaly detection system 101 may detect one or more anomalous values in a particular fingerprint 111 of an entity or entity cluster. The anomaly detection system 101 may use anomaly detection thresholds. Thresholds, such as ±3 standard deviations, may be set by the anomaly detection system 101 for each time horizon to define what constitutes an unusual value. Anomalies may be flagged if a resource transfer falls outside these thresholds for at least one horizon. To reduce false positives, the anomaly detection system 101 may evaluate discrepancies across multiple horizons, allowing context (e.g., seasonality or user type) to inform whether an outlier is truly anomalous or part of a known pattern. The anomaly detection system 101 may be configured to detect seasonality. Seasonality may be detected by the anomaly detection system 101 by comparing short-term (e.g., monthly) and long-term (e.g., annual) parameters. If discrepancies exist, the anomaly detection system 101 may infer a seasonal pattern.

For example, say an entity has an annual average of 100 units with a standard deviation of 10, and their semiannual and monthly averages are also around 100±10. If the anomaly detection system 101 determines that all these metrics align closely, the anomaly detection system 101 may determine consistent behavior with minimal seasonality—essentially flat activity within normal noise levels. However, if seasonality is detected—such as higher activity in the fall and lower in the spring—the annual mean may fall between these extremes, resulting in a larger standard deviation due to the wide range of values. In contrast, the anomaly detection system 101 may detect a semiannual mean during the low season (e.g., spring) that might show a smaller standard deviation, reflecting the narrower range of values during that period. This discrepancy between the annual and semiannual means may be determined by the anomaly detection system 101 to signal the presence of seasonality. For example, if a user experiences a temporary dip in activity during the spring (a low season), the annual average might falsely suggest an anomaly, while the anomaly detection system 101 may determine the semiannual average to confirm that the behavior is still within normal bounds. By analyzing these time horizons and storing their mean and standard deviation values, the system may avoid the need to maintain complex models for each user. Instead, the system may update these parameters daily using the latest data point, ensuring computational efficiency. Each day, the anomaly detection system 101 may evaluate whether a user falls outside the defined thresholds for all, some, or none of the time horizons (e.g., annual, semiannual, monthly), based on their mean and standard deviation. This may allow for a nuanced interpretation of anomalies—distinguishing between genuine outliers and deviations that may be explained by seasonal patterns or normal fluctuations. This approach may allow the anomaly detection system 101 to detect true anomalies while factoring in seasonal fluctuations, without relying on full time-series analysis or model-building. This approach may significantly reduce computational time, data storage requirements, and the overhead of maintaining seasonality models, while still effectively capturing seasonal effects through threshold comparisons across multiple time frames. It may also eliminate the need to explicitly build or train complex seasonality models.

The anomaly detection system 101 may provide for threshold tuning and sensitivity. Thresholds may be adjusted globally for simplicity or tailored to specific entities or clusters. Tighter thresholds (e.g., ±2σ) may increase sensitivity to anomalies but may generate more false positives, while looser thresholds (e.g., ±3σ) may reduce noise but threat missing subtle issues. The anomaly detection system 101 may further refine sensitivity by factoring in user threat levels or cluster-specific fluctuation metrics, ensuring the system adapts to varying contexts.

By way of example with respect to detecting an anomalous value in a parameter fingerprint instance 111 associated with an entity or cluster, transfers performed at a bank branch in Wichita, Kansas may be monitored by the anomaly detection system 101, potentially, during a specific day of the week (e.g., Fridays). Based on analyzing the parameter fingerprint instance 111, which includes statistical parameters (e.g., mean, variance) across multiple time horizons (e.g., annual, semiannual, monthly), a confidence interval (e.g., a range) may be determined that indicates a threshold confidence value (e.g., 95%) for the number of transfers on any given Friday. For instance, if the annual mean is 325 transfers with an annual variance of 25, the anomaly detection system 101 may derive a monthly confidence interval (e.g., between 300 and 350 transfers) based on the weighted averaging mechanism described above. However, the parameter fingerprint instance 111 associated with a particular Friday may indicate that there were only 100 transfers. The anomaly detection system 101 may detect this value as being outside the threshold confidence interval and may flag this as a potential anomaly. As another example, anomaly detection system 101 may use one or more unsupervised data processing techniques, such as identifying drifts (e.g., unidirectional temporal changes in data), event changes (e.g., systematic or instantaneous changes from typical behavior), and/or outlier deviations (e.g., patterns that appear outside typical behaviors) to detect an anomalous value in the parameter fingerprint instance 111. These techniques may leverage the stored mean and variance values across time horizons to compute dynamic thresholds.

Any suitable techniques, such as outlier deviation algorithms, mathematical means, standard deviations, medians, and quantiles, may be used to detect anomalous behavior in time series data. For example, if the median of transfers across monthly time horizons is 300 per day with a standard deviation of 25, then a value of 100 transfers would be flagged by the anomaly detection system 101 as an outlier on a normal distribution curve derived from the stored statistical parameters. The anomaly detection system 101 may use the mean and variance values from the parameter fingerprint instance 111 to compute these thresholds dynamically, ensuring alignment with the entity-specific or cluster-specific parameter fingerprints.

Additionally or alternatively, one or more supervised and/or unsupervised machine-learning techniques may be used to detect an anomalous value in the parameter fingerprint instance 111. By way of example, a labeled dataset (e.g., time series data instances labeled with an indicator of anomalous or normal behavior) may be used to train a machine-learning model to classify a time series data instance provided as input as being anomalous or normal. However, the system may prioritize the use of statistical parameters (mean, variance) and weighted averaging mechanisms, with machine learning serving as an optional enhancement for complex or high-dimensional data.

As indicated by block 116, operations may be performed to validate that an actual anomaly has occurred. In some embodiments, a subset of correlated peers may be identified based on shared attributes (e.g., geographic location, cluster membership, or other predefined hierarchies). This subset of correlated peers may be selected from time series data of correlated peers 109, which are entities or clusters that share common parameter fingerprints or statistical characteristics. For example, if the parameter fingerprint instance 111 corresponds to a bank branch in Wichita, Kansas, the anomaly detection system 101 may identify correlated peers from the same city or cluster based on their parameter fingerprints (e.g., similar mean and variance values across time horizons).

By way of example, the anomaly detection system 101 may determine whether the time series data values of each of the subset of correlated peers also fell outside their respective confidence intervals. If the parameter fingerprint instance 111 indicates an anomalous value that falls outside its corresponding confidence interval (e.g., based on mean and variance values), but the values corresponding to at least a predefined threshold (e.g., 90%, 80%, etc.) of the first subset of correlated peers fell within their respective confidence intervals, the anomalous value of fingerprint instance 111 may be validated as a true anomaly.

Alternatively, if at least some threshold (e.g., 15%, 20%) of the first subset of correlated peers were also deemed anomalous (e.g., their respective time series data included values that fell outside their confidence intervals), the anomaly detection system 101 may determine that the parameter fingerprint instance 111 is not anomalous (or at least not uniquely anomalous) with respect to the first subset of correlated peers. This comparison may be repeated across multiple correlated peer groups according to a predefined protocol, leveraging the stored parameter fingerprints (e.g., mean, variance) to identify patterns. Through this process, the source and/or impact of an anomaly may be identified. For instance, if the parameter fingerprint instance 111 is compared to time series data of correlated peers that share a common attribute (e.g., geographic location, cluster membership, or industry sector), and at least a threshold percentage (e.g., 90%, 80%) of those correlated peers exhibit similarly anomalous behavior, the anomaly detection system 101 may conclude that the anomaly is attributable to a broader factor affecting all entities sharing that common attribute.

As indicated by block 118, the anomaly detection system 101 may perform one or more automated interventions may be implemented based on detection of the anomaly source and validation of the anomaly. In various embodiments, any suitable number of interventions may be employed by the anomaly detection system 101 to notify, mitigate, forecast, and/or limit potential negative effects caused by the anomalous source. In various embodiments, these interventions may be triggered by the techniques discussed herein automatically and/or by user-defined presets. For example, the anomaly detection system 101 may provide for automated interventions and may include a rules-based intervention engine, which may automatically trigger predefined actions (e.g., blocking resource transfers, freezing entity accts, sending alerts to administrative users and/or compliance teams via user computing devices 102 and/or user accts associated therewith, such as sending push notifications, emails, instant messaging, pop-ups, and/or the like to a laptop, a personal computer, a workstation, a smartphone, a touchscreen tablet computer, a personal digital assistant, a wearable device, etc.) in response to detected anomalies. These interventions may be governed by a threat matrix, which maps anomaly severity (e.g., scores from 1-100) to specific actions aligned with compliance and prevention protocols. For instance, high-severity anomalies—such as sudden spikes in transfer volumes or transfers—may trigger immediate blocking of resource transfers via API integration with resource-controlling systems or freezing entity accts to prevent unauthorized activity. Medium-severity anomalies, such as deviations in transfer patterns or entity behavior, may prompt automated alerts to internal teams via email, SMS, or process flow notifications for investigation or escalation. Low-severity anomalies, such as minor data inconsistencies or routine transfer delays, may be logged for future analysis or flagged for manual review. This framework may ensure proactive threat mitigation, preventing attack/wrongful use, unauthorized transfers, and regulatory breaches by acting before human intervention is required.

The anomaly detection system 101 may integrate seamlessly with resource-controlling systems backend processes through APIs, microservices, and process flow engines tailored for resource-controlling systems. For example, resource transfer blocking APIs can halt suspicious transfers to prevent unauthorized activity, while entity acct freeze APIs can lock entity accts when anomalies are detected. Compliance alert process flows can send notifications to internal teams via email, SMS, or internal ticketing systems for follow-up. Additionally, the anomaly detection system 101 may implement compliance process flows, which automatically adjust thresholds or rules based on historical intervention success rates. By way of example, the anomaly detection system 101 may calculate the anomaly score using the threat matrix, determine it exceeds the threshold for high severity, and trigger multiple actions: blocking the suspicious transfer (e.g., halting a large international transfer flagged based on the anomaly) via core system API integration, freezing the entity's acct (e.g., temporarily suspending access to the entity's online portal) via an entity acct freeze API, and triggering an alert to the attack/wrongful use detection team via a compliance process flow for escalation. The anomaly detection system 101's ability to automate alerts and interventions via bank-system-specific APIs or process flows (e.g., blocking resource transfers, freezing entity accts) represents an improvement over manual reviews or static thresholds, with the anomaly detection system 101 dynamically linking anomaly severity to predefined actions, enabling real-time, context-aware threat management aligned with regulatory frameworks. The integration of threat matrices, core APIs, and compliance process flows ensures scalability, precision, and adaptability, making the anomaly detection system 101 uniquely suited for rapid response to threats and compliance with regulations. This framework enhances the dynamic threshold adjustment and automated interventions by expanding the scope of actionable responses to specific use cases. It introduces API-driven automation for blocking resource transfers and freezing entity accts, complementing process flows. The use of a threat matrix may ensure interventions are prioritized based on severity, optimizing resource allocation and regulatory alignment. Furthermore, the anomaly detection system 101 may leverage intervention outcomes (e.g., success rates of blocking transfers or freezing entity accts) to refine the threat matrix and improve future decisions. By integrating these components, the anomaly detection system 101 becomes a fully automated, intelligent threat management engine, providing a scalable solution for attack/wrongful use prevention, compliance, and operational efficiency.

Figure 2:
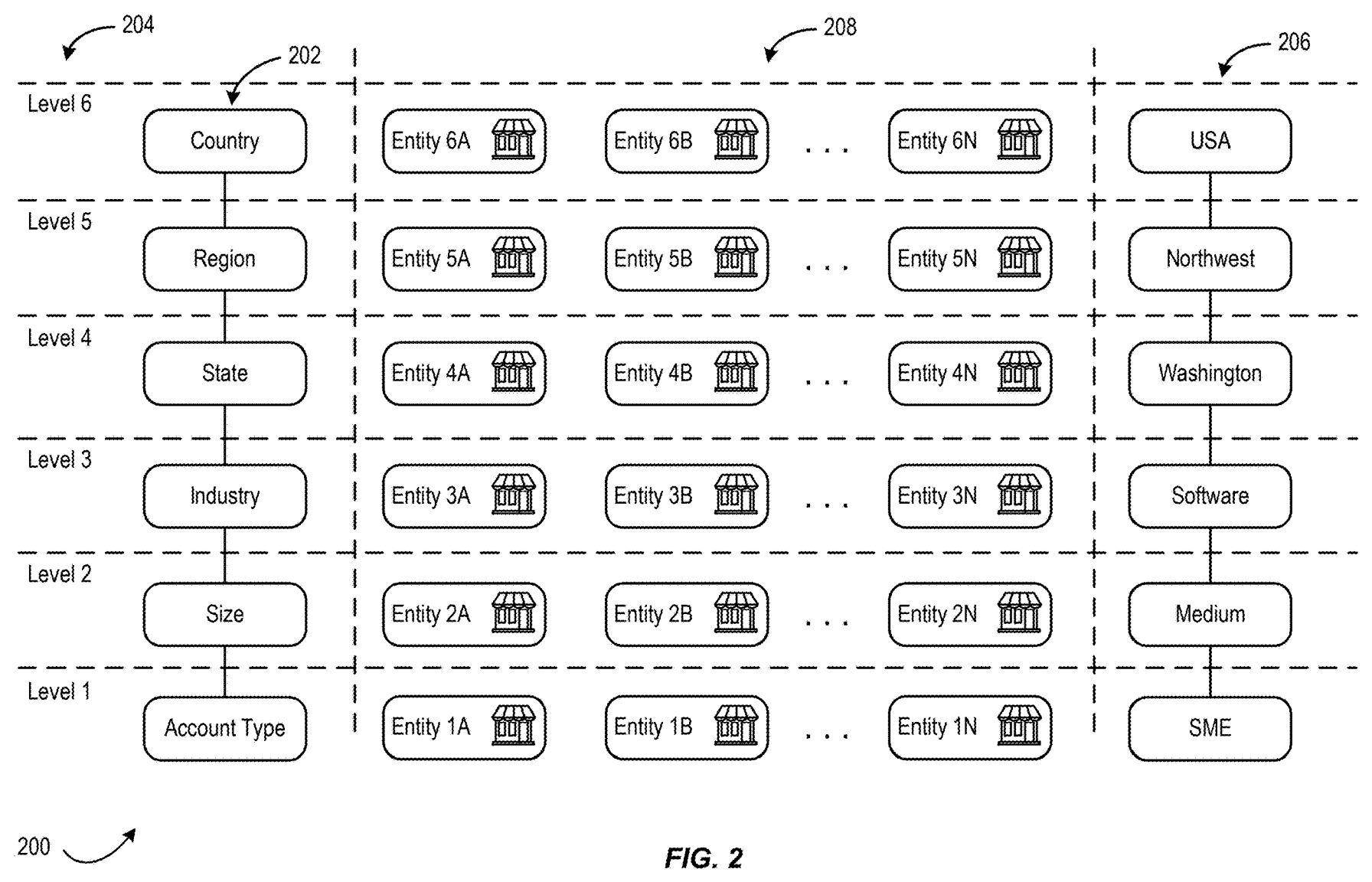

FIG. 2 is an example block diagram 200 illustrating an example hierarchy 202 with which a number of entities correspond, in accordance with at least one embodiment. In some embodiments, the hierarchy 202 may be pre-determined and may represent, in this example, user-related attributes or relationships. As depicted at 204, hierarchy 202 may include one or more levels, such as country, region, state, county, city, industry, size, entity acct type, and/or the like. While six levels are depicted at 204, it is contemplated that any suitable number of levels may be utilized in hierarchy 202. In some embodiments, hierarchy 202 may represent an order and/or attributes with which correlated peers may be identified/grouped.

A particular entity (e.g., a user with an entity acct, such as "user ID 5678") may be represented in column 206. User ID 5678 may be associated with a number of attribute values that individually correspond to hierarchy 202. For example, user ID 5678 may be associated with various attributes corresponding to a country (e.g., "USA"), a geographic region (e.g., "Northwest"), a state (e.g., "Washington"), an industry (e.g., "software"), a company size (e.g., "medium"), and an entity acct type (e.g., "SME entity acct") as depicted in column 206.

Column 208 may represent entities that share an attribute value corresponding to an attribute of column 202 and to the corresponding attribute value of the entity represented in column 206. In some embodiments, the entities of column 208 may be entities from which correlated peers are identified for the entity represented in column 206. For example, entities 1A-1N may represent all entities that are associated with an entity acct attribute with a value equal to "SME" from which correlated peers may be selected for the entity represented in column 206, or entities 1A-1N may represent only the correlated peers of the entity represented in column 206 that are associated with the same entity acct type as the entity represented in column 206 (e.g., "SME"). Similarly, entities 2A-2N may represent all entities that are associated with a size attribute with a value equal to "medium" from which correlated peers are selected for the entity represented in column 206, or entities 2A-2N may represent only the correlated peers of the entity represented in column 206 that are associated with the same size as the entity represented in column 206 (e.g., "medium"). Likewise, entities 3A-3N may include all entities (or only correlated peers) that share the same value (e.g., "software") for an industry attribute, entities 4A-4N may include all entities (or only correlated peers) that share the same value (e.g., "Washington") for a state attribute, entities 5A-5N may include all entities (or only correlated peers) that share the same value (e.g., "Northwest") for a region attribute, and entities 6A-6N include all entities (or only correlated peers) that share the same value (e.g., "USA") for a country attribute.

In some embodiments, determining correlated entity peers involves applying one or more correlation analysis algorithms (e.g., Pearson correlation coefficient algorithms or similar) to compare time series data of multiple entities to find those that exhibit similar patterns in transfer metrics. By way of example, a user with an SME entity acct in the software industry (entity 3B) may be identified through correlation analysis and respective time series data as having similarly fluctuating activity (e.g., transfer frequency, entity acct usage, or inflows trends) as user ID 5678, the entity represented in column 206. Accordingly, entity 3B may be considered to be a correlated peer of user ID 5678. The correlation algorithm may process the time series data of each pair of entities (e.g., entity 3A and the entity represented in column 206) and attempt to correlate the data (e.g., output a value between −1 and 1). If an output (e.g., correlation coefficient) of the correlation algorithm is either −1 or +1, it will show that there is a strong negative or strong positive correlation between the time series data of the two entities. If a correlation coefficient close to +1 (e.g., a difference that is less than a threshold value) is determined, the anomaly detection system 101 may determine that the two entities are correlated peers. In an instance where the correlation coefficient is closer to 0 (e.g., a difference that is less than a threshold value), the anomaly detection system 101 may determine that the two entities are not correlated peers.

FIG. 3 is a block diagram illustrating an example method 300 for identifying a source of an anomaly based at least in part on entity fingerprint parameters data, in accordance with at least one embodiment. However, teachings of the present disclosure may be implemented in a variety of configurations. As such, the order of the steps comprising the method 300 and/or other methods disclosed herein may be shuffled or combined in any suitable manner and may depend on the implementation chosen. Moreover, while the following steps may be separated for the sake of description, it should be understood that certain steps may be performed simultaneously or substantially simultaneously. A non-transitory, computer-readable storage medium may store computer-executable instructions that, when executed by at least one processor, cause at least one computer to perform instructions comprising the operations of the method 300. The method 300 may be performed by the anomaly detection system 101 of FIG. 1 based at least in part on a hierarchy (e.g., hierarchy 200 of FIG. 2). The operations of method 300 may be performed by any suitable portion of the anomaly detection system 101 of FIG. 1.

The method 300 may provide for hierarchical peer comparison, focusing on relationships defined by explicit levels of hierarchy and relying on statistical similarity among correlated peers. The method 300 may attribute anomalies to the most granular hierarchical level possible by comparing an entity's statistical fingerprint parameters to those of its correlated peers across multiple levels of a predefined hierarchy (such as entity acct type, size, industry, location, etc.). The method 300 may begin at step 302, where the anomaly detection system 101 may identify anomalous behavior corresponding to a first entity at least in part by analyzing the fingerprint parameters (core statistics based on time series data) corresponding to the first entity. By way of example, anomalous behavior may be identified in data corresponding to the fingerprint parameters of the entity, such as the statistical summaries (e.g., mean, variance, and confidence intervals) derived from the entity's time series data. As a non-limiting example, the time series data may indicate that inflows for the day fell below a confidence interval associated with the entity (e.g., entity acct 1234). This confidence interval may be computed using core statistics from the fingerprint parameters, such as the mean and variance of the entity's historical data over predefined time horizons (e.g., daily, weekly). As another example, the entity's mean transfer frequency (a fingerprint parameter) may be calculated as 50 transfers/day based on historical data. A new fingerprint update may reveal that the current mean transfer frequency is 5 transfers/day, which falls outside the 95% confidence interval (e.g., mean±3σ) derived from the stored fingerprint parameters. This deviation may be flagged as a potential anomaly because it indicates a statistically significant shift in the entity's behavior, without requiring analysis of the raw time series data. This approach allows the anomaly detection system 101 to detect anomalies without examining the entire raw time series data, thereby reducing computational overhead and enabling real-time detection.

At 304, a first set of correlated peers may be identified for the entity based at least in part on a first level of a hierarchy.

In some embodiments, the lowest level of the hierarchy (e.g., level 1 of the hierarchy 200) may correspond to an entity acct type. The hierarchy may be traversed upward to a next level (e.g., level 2, corresponding to a size) to identify entities that share the same hierarchical attribute (e.g., size). The anomaly detection system 101 may then compare the fingerprint parameters (e.g., mean and variance) of the first entity with those of the entities in the first level to identify correlated peers whose time series data exhibits similar statistical behavior. This comparison may be performed using correlation analysis techniques, such as cosine similarity or Pearson correlation, applied to the fingerprint parameters rather than the raw time series data.

At 306, it may be determined that the fingerprint parameters data corresponding to the first entity is not anomalous with respect to the fingerprint parameters data corresponding to the first set of correlated peers. By way of example, if the anomalous behavior indicates that the first entity's inflow fell below its confidence interval, the anomaly detection system 101 may analyze the fingerprint parameters of the correlated peers to determine whether at least a threshold number or percentage of them also exhibit inflows values falling outside their respective confidence intervals. In some embodiments, if fewer than the threshold number or percentage of the correlated peers are associated with time series data that did not fall outside of their respective confidence intervals, the anomalous behavior may be attributed to the first entity, and the method 300 may halt. Alternatively, if at least the threshold number or percentage of the correlated peers are associated with fingerprint parameters data that likewise fell outside of their respective confidence intervals, then the method 300 may proceed to 308.

At 308, a second set of correlated peers corresponding to a second level of the hierarchy may be identified. By way of example, the hierarchy 200 may be traversed upward from level 2 (e.g., size) to level 3 (e.g., industry, such as software). The anomaly detection system 101 may identify entities at this level that share the same hierarchical attribute (e.g., software) and may compare their fingerprint parameters with those of the first entity to find correlated peers whose statistical summaries (mean, variance, confidence intervals) align with the first entity's behavior. This comparison may be performed using the same correlation analysis techniques applied to the fingerprint parameters, avoiding the need to process raw time series data for all entities in the higher-level hierarchy.

At 310, it may be determined that the fingerprint parameters data corresponding to the first entity is anomalous with respect to the fingerprint parameters data corresponding to the second set of correlated peers. By way of example, if the anomalous behavior indicates that the first entity's inflows fell below its confidence interval, but the fingerprint parameters of the second set of correlated peers (e.g., entities in the state level) show that fewer than the threshold number or percentage of them exhibit similar deviations from their confidence intervals, the anomaly detection system 101 may deem the fingerprint parameters data of the first entity as anomalous. This determination may be based solely on the statistical summaries (fingerprint parameters) of the entities, not the raw time series data itself.

At 312, based at least in part on determining that the fingerprint parameters data of the first entity is anomalous with respect to the fingerprint parameters data of the second set of correlated peers corresponding to the second level of the hierarchy, the anomalous behavior may be determined to relate to the first level of the hierarchy (e.g., the level at which the first set of correlated peers was identified). The anomaly detection system 101 may leverage the fingerprint parameters to pinpoint the hierarchical level where the anomaly is localized, enabling efficient designation of the anomaly to a specific group of entities (e.g., size) rather than broader regions (e.g., industry). Although this example only traverses one level upward in the hierarchy (e.g., from level 2 to level 3), it should be appreciated that any suitable number of upward traversals may be performed. When the fingerprint parameters of correlated peers at a higher level (or at least a threshold number/percentage of those peers) exhibit statistical behavior that conforms to the first entity, the source/impact of the anomaly may be determined to relate to entities that share an attribute value corresponding to the level of the hierarchy immediately below the higher level. This approach may ensure that the system focuses on the most relevant hierarchical level for anomaly designation, without requiring exhaustive analysis of the entire time series data for all entities in the hierarchy.

The use of fingerprint parameters (e.g., mean, variance, and confidence intervals) may enable the anomaly detection system 101 to detect and isolate anomalies efficiently by focusing on statistical summaries rather than raw time series data. This may reduce computational complexity, accelerate analysis, and allow for scalable anomaly detection across large datasets. Additionally, the comparison of fingerprint parameters across hierarchical levels may ensure that anomalies are attributed to the most granular and relevant group of entities, improving the accuracy of root cause identification.

In accordance with at least one embodiment, entities may be associated with hierarchical levels (e.g., industry type, size, region, country) and statistical fingerprint parameters (e.g., mean inflows/outflows at various time horizons, corresponding variances and confidence intervals for transfers). These attributes enable efficient anomaly detection and localization by clustering entities based on shared hierarchical levels or statistical similarities. For example, entities may be clustered based on shared values for attributes at different levels of a hierarchy, as illustrated in the process flow described in connection with FIG. 3.

Entities may be correlated based on shared attribute values across different hierarchical levels. For instance, entities may be clustered based on shared values for a lower-level attribute such as "region" (e.g., a specific city or geographic area), a mid-level attribute such as "type of premises" (e.g., office, retail store, or warehouse), or a higher-level attribute such as "industry type" (e.g., technology, manufacturing, etc.). Correlated peers may be identified by comparing statistical fingerprint parameters (e.g., mean inflows, variance in operational metrics) across entities sharing these attribute values, as described in the hierarchical traversal approach outlined in the earlier input.

The hierarchical structure and statistical fingerprint parameters may facilitate efficient anomaly detection by comparing an entity's fingerprint parameters against those of correlated peers at different levels of the hierarchy. For example, an anomaly in an entity's fingerprint parameters (e.g., a significant deviation in mean inflows) may be localized to a specific hierarchical level (e.g., "industry type" or "size") by comparing its parameters against peers at lower, mid, or higher levels, as described in the process flow outlined in the earlier input. This approach may ensure scalability, precision, and computational efficiency in identifying and isolating anomalies.

FIG. 4 is a block diagram illustrating an example method 400 for determining one or more correlated peers utilizing division/clustering techniques, in accordance with at least one embodiment. However, teachings of the present disclosure may be implemented in a variety of configurations. As such, the order of the steps comprising the method 300 and/or other methods disclosed herein may be shuffled or combined in any suitable manner and may depend on the implementation chosen. Moreover, while the following steps may be separated for the sake of description, it should be understood that certain steps may be performed simultaneously or substantially simultaneously. A non-transitory, computer-readable storage medium may store computer-executable instructions that, when executed by at least one processor, cause at least one computer to perform instructions comprising the operations of the method 400. The operations of method 400 may be performed by any suitable portion the anomaly detection system 101 of FIG. 1.

The method 400 may provide for attribute-based division/clustering, focusing on relationships defined by any shared attribute. The method 400 may attribute anomalies to specific attribute-based clusters or divisions, regardless of their place in a hierarchy. The method 400 may flexibly segment entities based on shared attribute values (e.g., industry, ATM type, region) and may compare anomaly fingerprints across these divisions. The method 300 may facilitate hierarchical anomaly designation by analyzing fingerprint parameters across predefined levels of a structured hierarchy, narrowing anomalies to the most specific group of correlated peers. In contrast, the method 400 may facilitate attribute-driven anomaly detection by grouping entities based on shared attribute values and comparing fingerprint parameters across these clusters, enabling adaptive localization of anomalies to attribute-defined groups. Both methods may leverage core statistical fingerprint data and can be employed independently or in combination by the anomaly detection system 101's engines to deliver robust, scalable, and context-aware anomaly identification across diverse datasets. In some examples, initial anomaly detection may use the method 300 to localize the anomaly within the hierarchy, then, if further granularity or a non-hierarchical relationship is determined, the method 400 may be invoked to analyze anomalies across attribute-based clusters. Both methods may iteratively inform the anomaly detection system 101's dynamic threshold adjustment and feedback loops.

The method 400, may begin at 402, where the anomaly detection system 101 may identify anomalous behavior corresponding to a first entity. By way of example, anomalous behavior may be identified as described in connection with FIG. 1 and/or FIG. 3. At 404, a first set of entities and a second set of entities may be identified based at least in part on an attribute of the first entity. In some embodiments, the entities of the first and second set may be correlated peers of the first entity. In some embodiments, the first set of entities may be identified for the first entity based at least in part on identifying entities that share a common attribute value for the attribute. By way of example, a first set of entities may be identified based at least in part on the entities having the same attribute value (e.g., "Software") for the attribute "Industry." The second set of entities may be the set of entities that do not share the same attribute value for the attribute as the first entity.

At 406, the anomaly detection system 101 may determine whether the fingerprint parameters data (based on time series data) corresponding to the first entity conforms to the fingerprint parameters data corresponding to the first set of entities. This may include determining whether the fingerprint parameters data of the first set of entities had similarly anomalous behavior. As a non-limiting example, if the fingerprint parameters data of the first entity indicates the number of inflows has fallen below a corresponding confidence interval/threshold, the anomaly detection system 101 may determine whether the fingerprint parameters data of the first set of entities likewise include values that fell below their corresponding confidence intervals/thresholds. In some embodiments, if the fingerprint parameters data of the first set of entities does not exhibit similarly anomalous behavior, the method 400 may begin again using a different attribute to determine the first set of entities and the second set of entities. If the time series data of the first set of entities conform (exhibit similarly anomalous behavior) as the fingerprint parameters data of the first entity, the method 400 may proceed to 408.

At 408, the anomaly detection system 101 may determine whether the fingerprint parameters data corresponding to the first entity conforms to the fingerprint parameters data corresponding to the second set of entities. If the fingerprint parameters data of the second set of entities exhibits similarly anomalous behavior, the method 400 may begin again using a different attribute to determine the first set of entities and the second set of entities. If the fingerprint parameters data of the first set of entities do not exhibit similarly anomalous behavior, then the method 400 may proceed to 408.

At 410, the anomaly detection system 101 may determine that the anomalous behavior relates to the first set of entities and/or the attribute. This determination may be based at least in part on determining that the fingerprint parameters data of the first set of entities conforms (exhibits similarly anomalous behavior) to the fingerprint parameters data of the first entity, and that the fingerprint parameters data of the second set of entities does not conform (does not exhibit similarly anomalous behavior) to the fingerprint parameters data of the first entity.

The method 400 may be performed any suitable number of times, using any suitable number of attribute divisions/clustering. The order and/or specific attribute by which entities/fingerprint parameters data instances are grouped into the first set or second set may depend on a predefined attribute order. By way of example, a predefined order of attributes (also referred to as a "division scheme") may be stored by the anomaly detection system 101 which indicates that, when attempting to identify whether an entity's fingerprint parameters behavior is anomalous with respect to the fingerprint parameters data of other entities (e.g., correlated peers), the fingerprint parameters of entities/correlated peers may be analyzed first based on industry type, then by size values, followed by entity acct type values. In some embodiments, the order of attributes/division scheme may be determined based on determining, from the attributes of all entities (or all correlated peers), which attributes have the largest number of common values. By way of example, if approximately 40% of the first entity's correlated peers correspond to medium size and the other 40% do not, but 80% of the first entity's correlated peers share the same industry type, the anomaly detection system 101 may group correlated peers based on industry type over grouping correlated peers based on drive throughs, since an anomaly that is confirmed across a larger number of correlated peers may more conclusively indicate that the anomaly is associated with that attribute, than if the anomaly was confirmed to exist in a smaller grouping.

FIG. 5 is a schematic diagram of an example computer architecture for an anomaly detection system 500, including a plurality of modules 502 that may perform functions in accordance with at least one embodiment. The anomaly detection system 500 may be an example of the anomaly detection system 101, and may be configured to perform the processes, methods, operations, and techniques described above, including those for minimally monitored anomaly source detection based on seasonality. The modules 502 may be software modules, hardware modules, or a combination thereof. If the modules are software modules, the modules can be embodied on a computer-readable medium and processed by a processor in any of the computer systems described herein. It should be noted that any module or data store described herein, may be, in some embodiments, be a service responsible for providing functionality corresponding to the module described below. The modules 502 may be executed as part of the anomaly detection system 500, or the modules 502 may exist as separate modules or services external to the anomaly detection system 500. In some embodiments, the modules 502 may be executed by the same or different computing devices, as a service, as an application, or the like.

In the embodiment shown in the FIG. 5, data stores such as time series data 508, fingerprint data 530, hierarchical specification data 540, entity specification data 550, and correlated data 560 are shown, although data can be maintained, derived, or otherwise accessed from various data stores, either remote or local to the anomaly detection system 500, to achieve the functions described herein. The anomaly detection system 500, as shown in FIG. 5, includes various modules such as a data processing module 510, anomaly detection module 520, hierarchical anomaly detection engine 522, correlated peers identification engine 524, division anomaly detection engine 526, and intervention manager 528. Some functions of the modules are described below. However, for the benefit of the reader, a brief, non-limiting description of each of the modules is provided in the following paragraphs.

Time series data 508 may include time series data instances provided by any suitable database, server, cloud infrastructure, and/or monitoring service that provides one or more time series data instances, according to some embodiments. By way of example, the time series data 508 may be collected from different sources (e.g., entity accts, branches, ATMs, institutions, etc.) at pre-defined frequencies or according to a predefined schedule. As a further non-limiting example, the frequency of time series data retrieval may be adjustable based on a user defined preference (e.g., via a GUI) or adaptively (e.g., using a deep learning scheme based on historical data). In some examples, data from the time series data 508 may be obtained and/or stored according to a predefined schedule, frequency, or periodicity, or via request. In some embodiments, the frequency at which time series data is collected may be automatically modified by the anomaly detection system 500 based at least in part on identifying and/or validating that an anomaly has occurred.

Fingerprint data 530 may include a structured repository within the anomaly detection system 500 that stores statistical parameter fingerprints for both individual entities and clusters of entities. For each monitored entity—such as an entity acct, branch, or ATM—the fingerprint data 530 may maintain statistical summaries, including mean values, variances, standard deviations, and confidence intervals, calculated across multiple time horizons (e.g., annual, semiannual, quarterly, monthly, weekly, daily). These parameters may form the entity-specific fingerprints, providing a compact statistical profile of each entity's typical behavior and seasonal trends. For clusters of entities—grouped by shared hierarchical or attribute values—fingerprint data 530 may store aggregated metrics that characterize the cluster as a whole, enabling group-level anomaly detection and dynamic threshold adjustment. The fingerprint data 530 may be continuously updated by the data processing module 510 as new time series data is ingested, ensuring that anomaly detection and peer comparison processes are based on current, context-aware statistical information. The repository may support rapid retrieval and efficient comparison of statistical fingerprints, enabling both hierarchical and attribute-based anomaly localization as described in methods above. By maintaining detailed, multi-horizon statistical fingerprints for entities and clusters, fingerprint data 530 may facilitate scalable, seasonality-aware, and minimally monitored anomaly source detection.

Hierarchy specification data 540 may correspond to a data store within the anomaly detection system 500 that encodes the predefined hierarchical structures used for organizing entities and guiding hierarchical peer analysis. The hierarchy specification data 540 may define one or more multi-level hierarchies—such as entity acct type, company size, industry sector, geographic location (e.g., city, state, region, country), or other relevant attributes—used to group entities for the purposes of anomaly designation (e.g., with method 300). For each hierarchy, hierarchy specification data 540 may specify the order and relationship of levels, as well as the attribute values that characterize each level and the mapping of individual entities to their respective positions within the hierarchy. This may allow the anomaly detection system 500 to systematically traverse from the most granular to broader groupings, enabling efficient identification of correlated peers at each hierarchical level. The hierarchy specification data 540 may be accessed by the hierarchical anomaly detection engine 522 during peer comparison and localization processes, ensuring that anomalies can be attributed to the most relevant subgroup within the structure. Furthermore, the hierarchy specification data 540 may support dynamic adaptation by accommodating multiple hierarchies or updating existing hierarchies as operational or other contexts evolve. By providing a comprehensive and structured representation of hierarchical relationships among entities, the hierarchy specification data 540 may enable context-aware, scalable, and highly targeted anomaly detection across complex, multi-entity environments.

Entity specification data 550 may correspond to a data store within the anomaly detection system 500 that maintains detailed attribute information for all monitored entities, such as entity accts, branches, ATMs, or other operational units. For each entity, the entity specification data 550 may record a comprehensive set of attribute values, which may include but are not limited to industry type, geographic location, entity acct type, company size, ATM model, product line, service category, and other relevant characteristics. These attribute values may enable flexible grouping and clustering of entities for the purposes of attribute-based anomaly detection (e.g., with method 300). The entity specification data 550 may support both hierarchical and non-hierarchical organization, allowing entities to be segmented according to single or multiple attributes, and facilitating the identification of correlated peer groups based on shared operational, functional, or other features. The data store may also maintain mappings or lists that define the preferred order of attribute-based divisions or clustering schemes, optimizing the efficiency and specificity of anomaly localization. The division anomaly detection engine 526 may access the entity specification data 550 to dynamically group entities, compare statistical fingerprint parameters, and localize anomalies to the most relevant attribute-defined clusters. By providing a rich, extensible, and up-to-date repository of entity attributes, entity specification data 550 may enable context-aware, multidimensional, and highly adaptive anomaly detection across diverse and evolving datasets.

Correlated data 560 may correspond to a specialized data store within the anomaly detection system 500 that maintains mappings and groupings of correlated peers for all monitored entities. For each entity—such as an entity acct, branch, or ATM—the correlated data 560 may record sets of peers whose time series behaviors exhibit statistically significant similarities, as determined by correlation analysis techniques (e.g., correlation matrices, covariance ratios, time series fluctuation metrics, Pearson correlations, or other statistical similarity measures). These correlations may be established based on shared hierarchical attributes, operational characteristics, or observed behavioral patterns across multiple time horizons. The data store may organize correlated peer groups according to both hierarchical relationships (e.g., with method 300) and attribute-based clusters (e.g., with method 400), supporting efficient and context-appropriate peer selection during anomaly detection and source designation processes. The correlated data 560 may be dynamically updated by the correlated peers identification engine 524, which processes new and historical fingerprint data to reflect evolving entity behaviors and group relationships. This data store may enable rapid retrieval of relevant peer groups for comparative analysis, ensuring that both hierarchical and attribute-based anomaly detection engines (522, 526) have immediate access to up-to-date, statistically grounded peer associations. By systematically cataloging and maintaining correlated peer information, correlated data 560 may provide the analytical foundation necessary for robust, scalable, and context-aware anomaly detection and localization within complex, multi-entity environments.

The data processing module 510 may be configured to receive, aggregate, and preprocess time series data from the time series data store 508. Upon retrieval of raw data from monitored entities, the data processing module 510 may perform operations such as filtering, normalization, and temporal alignment to ensure consistency and accuracy of downstream statistical analysis. The module may calculate statistical summaries—including means, variances, standard deviations, and confidence intervals—across multiple time horizons for each entity and, where appropriate, for clusters of entities. These computed statistical fingerprints may then be stored in fingerprint data 530 and made available for real-time and historical anomaly detection. Additionally, the data processing module 510 may update entity attributes in entity specification data 550, refresh hierarchical mappings in hierarchy specification data 540, and trigger dynamic recalculation of correlated peer groups in correlated data 560 as new data becomes available or as monitoring frequency changes. By serving as the central hub for data ingestion and feature extraction, the data processing module 510 may ensure that all subsequent anomaly detection processes operate on current, high-quality, and contextually relevant statistical inputs.

The anomaly detection module 520 may analyze statistical fingerprint parameters received from data processing module 510 and stored in fingerprint data 530 to identify deviations from expected entity or cluster behavior. The module may apply dynamic thresholds, which may be based on standard deviation, confidence intervals, or quantile analysis, and can be tailored globally or per entity/cluster depending on threat sensitivity or operational context. Upon detecting an anomalous value, anomaly detection module 520 may determine whether the anomaly should be evaluated through hierarchical peer comparison (e.g., with the method 300) or attribute-based division/clustering (the method 400), invoking either the hierarchical anomaly detection engine 522 or the division anomaly detection engine 526 accordingly. The module may also incorporate machine learning techniques for pattern recognition in high-dimensional or complex datasets, supplementing the core statistical methodology. Furthermore, anomaly detection module 520 may interact with the intervention manager 528 to facilitate dynamic adjustment of detection thresholds and monitoring frequency in response to system feedback, thereby supporting ongoing adaptation to evolving seasonal or operational patterns.

The correlated peers identification engine 524 may be responsible for identifying and maintaining groups of correlated peers for each monitored entity within the anomaly detection system 500. Using statistical techniques such as correlation matrices, covariance analysis, time series similarity metrics, and fluctuation metrics comparisons, the engine 524 may evaluate both historical and recent fingerprint data to determine which entities exhibit similar behavioral patterns. Correlated peer groups may be established based on hierarchical relationships (for use in hierarchical anomaly detection engine 522) or attribute-based clusters (for use in division anomaly detection engine 526), as defined in hierarchy specification data 540 and entity specification data 550. The engine may dynamically update the correlated data 560 to reflect changes in entity behavior, newly added entities, or shifts in operational context. By ensuring that anomaly detection engines have access to relevant, up-to-date, and statistically grounded peer associations, the correlated peers identification engine 524 may provide the analytical infrastructure necessary for robust and scalable peer comparison across the system.

The division anomaly detection engine 526 may implement attribute-based anomaly detection, for example, in accordance with the method 400. Upon invocation by the anomaly detection module 520, the engine 526 may access the entity specification data 550 to segment entities into clusters or groups based on shared operational, functional, or other entity attributes (e.g., industry type, ATM model, geographic region, product line). The engine may compare statistical fingerprint parameters for the entity exhibiting anomalous behavior against those of its attribute-defined peer group, referencing fingerprint data 530 and correlated data 560. If the anomaly is present only within a specific attribute-defined cluster, the engine 526 may attribute the anomaly to that cluster; otherwise, it may iterate across alternative attributes or clustering schemes to further refine anomaly localization. This flexible approach may allow the system to detect and attribute anomalies that are not confined to hierarchical structures, supporting multidimensional and adaptive anomaly analysis across diverse datasets.

The intervention manager 528 may orchestrate automated responses upon validation of an anomaly's source and scope by either the hierarchical anomaly detection engine 522 or the division anomaly detection engine 526. The intervention manager 528 may apply a rules-based or threat-matrix-driven protocol to determine the severity of the detected anomaly and to execute predefined actions such as blocking resource transfers, freezing entity accts, sending notifications to compliance teams, or escalating alerts for manual review. The intervention manager 528 may integrate with backend systems via APIs or process flow engines to implement these actions in real time. Additionally, the module may support dynamic feedback by adjusting anomaly detection thresholds and monitoring frequencies based on the outcomes of interventions, thereby ensuring continual adaptation of the system to changing operational conditions and seasonal patterns. By providing automated, context-sensitive, and scalable threat mitigation, the intervention manager 528 may enhance the overall effectiveness and responsiveness of the anomaly detection system.

Further, the anomaly detection system 500 may include a dynamic threshold adjustment module 532 configured to leverage statistical feedback from cluster-level analysis to refine anomaly detection thresholds for individual entities and clusters. This module may operate continuously or at defined intervals to monitor aggregated cluster fingerprints—such as mean values, variances, and outlier frequencies—stored in fingerprint data 530. By analyzing these cluster-level metrics, the module can identify significant shifts in group behavior or statistical patterns that may indicate evolving operational contexts or seasonal effects. When the dynamic threshold adjustment module 532 detects a notable deviation in cluster metrics (for example, a sudden increase in variance or a persistent shift in cluster mean), it may automatically recalibrate the anomaly detection thresholds applied to individual entities or clusters. Adjustments may be performed using statistical algorithms, such as weighted moving averages, confidence interval recalibration, or, in some embodiments, machine learning models that entity acct for historical and contextual factors. For instance, if a cluster's average transfer volume increases by a threshold percentage over a specified period, the anomaly detection thresholds for entities within that cluster may be proportionally adjusted to reflect the new baseline, thereby reducing false positives and maintaining detection accuracy.

The dynamic threshold adjustment process may be implemented as a feedback mechanism that integrates real-time or periodic cluster insights into the broader anomaly detection process flow. As cluster characteristics evolve—due to seasonality, fluctuation metrics, or operational changes—the module 532 may recalculate and apply updated thresholds to subsequent anomaly detection cycles. This self-optimizing feedback loop may be supported by the underlying data infrastructure, including fingerprint data 530 and correlated data 560, which together provide the statistical context required for robust recalibration. To maintain stability and avoid overfitting, the system may impose validation checks or bounded adjustment ranges, ensuring that threshold changes remain within predefined limits. By incorporating this dynamic, cluster-driven threshold adjustment capability, the anomaly detection system 500 may achieve a higher degree of adaptability and contextual awareness. Entities belonging to volatile clusters may benefit from more frequent or sensitive recalibrations, while those in stable clusters may retain stricter anomaly boundaries. This approach may enable the system to more accurately distinguish between genuine anomalies and expected fluctuations, particularly in environments characterized by pronounced seasonality or rapidly changing operational conditions. The integration of cluster feedback may not only enhance detection precision but also may reduce manual intervention, supporting fully automated, scalable, and resilient anomaly source detection across large and diverse datasets.

Figure 6:
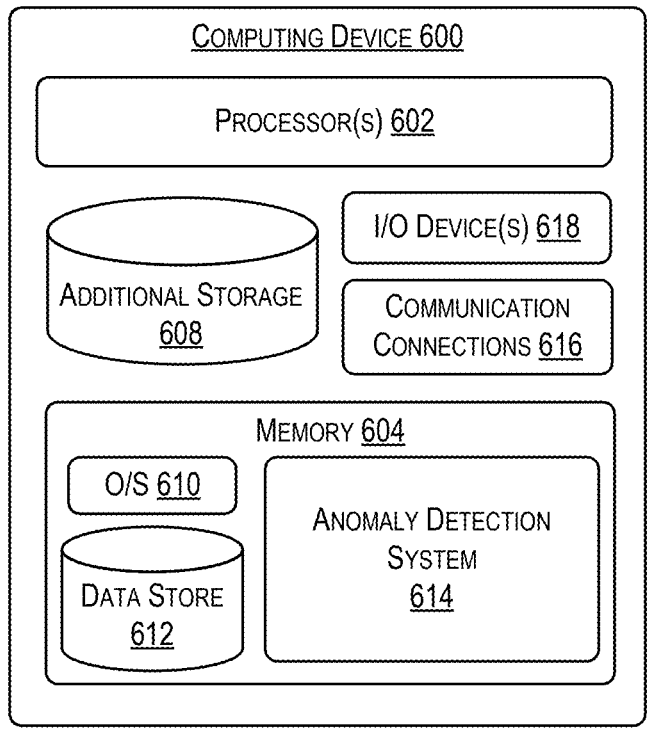
FIG. 6 illustrates an example computing device that may implement the methods disclosed herein.

FIG. 6 illustrates an example computing device 600 that may implement the methods disclosed herein. In some embodiments, the computing device 600 may include one or more processors (e.g., processor(s) 602). The processor(s) 602 may be implemented in hardware, computer-executable instructions, firmware, or combinations thereof. Computer-executable instruction or firmware implementations of the processor(s) 602 may include computer-executable or machine-executable instructions written in any suitable programming language.

Computing device 600 may include memory 604. The memory 604 may store computer-executable instructions that are loadable and executable by the processor(s) 602, as well as data generated during the execution of these programs. The memory 604 may be volatile (such as RAM) and/or non-volatile (such as ROM, flash memory, etc.). The computing device 600 may include additional storage 606, which may include removable storage and/or non-removable storage. The additional storage 606 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 604 or additional storage 606 may individually, or collectively, include multiple different types of memory, such as SRAM, DRAM, or ROM.

The memory 604 and/or additional storage 608 may be examples of computer-readable storage media. Computer-readable storage media may include volatile, or non-volatile, removable or non-removable media implemented in any method or technology for storage of information such as computer-readable instructions, data structures, program modules, or other data. In some embodiments, memory 604 and the additional storage 608 are examples of computer storage media. Memory 604 and/or additional storage 608 may include, but are not limited to, PRAM, SRAM, DRAM, RAM, ROM, EEPROM, flash memory or other memory technology, CD-ROM, DVD, magnetic tape, magnetic disk storage or other magnetic storage devices, or any other medium which can be used to store the desired information and which can be accessed by the computing device 600. Combinations of any of the above should also be included within the scope of computer-readable media. Computer-readable media may include computer-readable instructions, program modules, or other data transmitted within a data signal, such as a carrier wave, or other communication type. However, as used herein, computer-readable storage media does not include computer-readable communication media.

The memory 604 may include an operating system 608 and one or more data stores 610, and/or one or more application programs, modules, or services for implementing the features disclosed herein, such as the features provided by the anomaly detection system 614 (an example of the anomaly detection system 101 and/or 101).

The computing device may also contain communications connection(s) 616 that allow the computing device 600 to communicate with a stored database, another computing device, a server, user terminals and/or other devices (e.g., via one or more networks, not depicted). The computing device may also include I/O device(s) 618, such as a keyboard, a mouse, a pen, a voice input device, a touch input device, a display, speakers, a printer, etc.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes various devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or communication of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Where terms are used without explicit definition as recited herein, it is understood that the ordinary meaning of the word is intended, unless a term carries a special meaning in the field of anomaly detection or other relevant fields. The terms "about" or "substantially", "similar to", "similar", "approximately" are used to indicate a deviation from the recited property or numerical value within which the deviation has little to no influence of the corresponding function, property, or attribute of the structure being described. In an illustrated example, where a dimensional parameter is described as "substantially equal" to another dimensional parameter, the term "substantially" is intended to reflect that the two dimensions being compared can be unequal within a tolerable limit, such as a fabrication tolerance. In the present disclosure, "ranges" refers to a range of values between the two recited extents and/or including one of the two recited extents.

Disjunctive language such as the phrase "at least one of X, Y, or Z," unless specifically recited otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed:

1. A system comprising:
   one or more processing devices and memory communicatively coupled with and readable by the one or more processing devices, the memory comprising processor-readable instructions which, when executed by the one or more processing devices, cause the system to perform operations comprising:
      obtaining time series data individually corresponding to a plurality of entities;
      for each entity of the plurality of entities or for each cluster of entities of the plurality of entities, generating statistical parameter fingerprints comprising at least mean and variance values calculated across a plurality of time horizons, the plurality of time horizons including at least a first horizon and a second horizon;

storing the statistical parameter fingerprints in a data store associated with the system;

updating, for each entity or cluster, the statistical parameter fingerprints using a weighted averaging technique that incorporates newly received time series data;

comparing the statistical parameter fingerprints for a given entity or cluster across the plurality of time horizons to detect discrepancies indicative of seasonality;

defining anomaly detection thresholds for each time horizon based at least in part on the corresponding statistical parameter fingerprints;

detecting an anomalous value in the time series data of an entity or cluster by determining that a value falls outside the anomaly detection threshold for at least one time horizon; and upon validating that an anomaly has occurred, performing one or more automated interventions based on a severity assessment.

2. The system as recited claim 1, the operations further comprising validating whether the detected anomalous value is an anomaly by comparing the statistical parameter fingerprints of the entity or cluster to those of one or more correlated peers, the correlated peers identified based on shared hierarchical and/or attribute values.

3. The system as recited claim 1, the operations further comprising adjusting the anomaly detection thresholds dynamically in response to statistical feedback from cluster-level analysis.

4. The system as recited claim 1, wherein the one or more automated interventions comprise blocking a resource transfer.

5. The system as recited claim 1, wherein the one or more automated interventions comprise freezing an account.

6. The system as recited claim 1, wherein the automated interventions are triggered according to a threat matrix that maps anomaly scores to specific intervention actions.

7. The system as recited claim 6, wherein the threat matrix is dynamically updated based on intervention outcomes.

8. The system as recited claim 2, wherein the validating whether the detected anomalous value is an anomaly further comprises:

identifying correlated peers for the entity or cluster based on a first level of a hierarchy; and when the statistical parameter fingerprints of the entity or cluster are not anomalous with respect to first level peers, identifying correlated peers based on a second level of the hierarchy and determining whether the statistical parameter fingerprints of the entity or cluster are anomalous with respect to the correlated peers based on the second level.

9. A computer-implemented method comprising:

obtaining, by a computer system, time series data individually corresponding to a plurality of entities;

for each entity of the plurality of entities or for each cluster of entities of the plurality of entities, generating, by the computer system, statistical parameter fingerprints comprising at least mean and variance values calculated across a plurality of time horizons, the plurality of time horizons including at least a first horizon and a second horizon;

storing, by the computer system, the statistical parameter fingerprints in a data store associated with the computer system;

updating, by the computer system for each entity or cluster, the statistical parameter fingerprints using a weighted averaging technique that incorporates newly received time series data;

comparing, by the computer system, the statistical parameter fingerprints for a given entity or cluster across the plurality of time horizons to detect discrepancies indicative of seasonality;

defining, by the computer system, anomaly detection thresholds for each time horizon based at least in part on the corresponding statistical parameter fingerprints;

detecting, by the computer system, an anomalous value in the time series data of an entity or cluster by determining that a value falls outside the anomaly detection threshold for at least one time horizon; and upon validating that an anomaly has occurred, performing, by the computer system, one or more automated interventions based on a severity assessment.

10. The computer-implemented method as recited claim 9, further comprising validating whether the detected anomalous value is an anomaly by comparing the statistical parameter fingerprints of the entity or cluster to those of one or more correlated peers, the correlated peers identified based on shared hierarchical and/or attribute values.

11. The computer-implemented method as recited claim 9, further comprising adjusting the anomaly detection thresholds dynamically in response to statistical feedback from cluster-level analysis.

12. The computer-implemented method as recited claim 9, wherein the one or more automated interventions comprise blocking a resource transfer.

13. The computer-implemented method as recited claim 9, wherein the one or more automated interventions comprise freezing an account.

14. The computer-implemented method as recited claim 9, wherein the automated interventions are triggered according to a threat matrix that maps anomaly scores to specific intervention actions.

15. The computer-implemented method as recited claim 14, wherein the threat matrix is dynamically updated based on intervention outcomes.

16. The computer-implemented method as recited claim 10, wherein the validating whether the detected anomalous value is an anomaly further comprises:

identifying correlated peers for the entity or cluster based on a first level of a hierarchy; and when the statistical parameter fingerprints of the entity or cluster are not anomalous with respect to first level peers, identifying correlated peers based on a second level of the hierarchy and determining whether the statistical parameter fingerprints of the entity or cluster are anomalous with respect to the correlated peers based on the second level.

17. One or more non-transitory, machine-readable media having machine-readable instructions thereon which, when executed by one or more processing devices, cause a system to perform operations comprising:

obtaining time series data individually corresponding to a plurality of entities;

for each entity of the plurality of entities or for each cluster of entities of the plurality of entities, generating statistical parameter fingerprints comprising at least mean and variance values calculated across a plurality of time horizons, the plurality of time horizons including at least a first horizon and a second horizon;

storing the statistical parameter fingerprints in a data store associated with the system;

updating, for each entity or cluster, the statistical parameter fingerprints using a weighted averaging technique that incorporates newly received time series data;

comparing the statistical parameter fingerprints for a given entity or cluster across the plurality of time horizons to detect discrepancies indicative of seasonality;

defining anomaly detection thresholds for each time horizon based at least in part on the corresponding statistical parameter fingerprints;

detecting an anomalous value in the time series data of an entity or cluster by determining that a value falls outside the anomaly detection threshold for at least one time horizon; and upon validating that an anomaly has occurred, performing one or more automated interventions based on a severity assessment.

18. The one or more non-transitory, machine-readable media as recited claim 17, the operations further comprising validating whether the detected anomalous value is an anomaly by comparing the statistical parameter fingerprints of the entity or cluster to those of one or more correlated peers, the correlated peers identified based on shared hierarchical and/or attribute values.

19. The one or more non-transitory, machine-readable media as recited claim 17, the operations further comprising adjusting the anomaly detection thresholds dynamically in response to statistical feedback from cluster-level analysis.

20. The one or more non-transitory, machine-readable media as recited claim 17, wherein the one or more automated interventions comprise blocking a resource transfer.

* * * * *